United States Patent
Garvey et al.

(10) Patent No.: US 11,297,873 B2
(45) Date of Patent: Apr. 12, 2022

(54) KETOGENIC NUTRITIONAL COMPOSITIONS

(71) Applicant: Abbott Laboratories, Abbott Park, IL (US)

(72) Inventors: Sean Garvey, Columbus, OH (US); Stephen Demichele, Dublin, OH (US); Roger Tyre, Lithopolis, OH (US); Eric Torgerson, Columbus, OH (US); Steven Hertzler, Worthington, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 249 days.

(21) Appl. No.: 16/331,478

(22) PCT Filed: Sep. 5, 2017

(86) PCT No.: PCT/US2017/050099
§ 371 (c)(1),
(2) Date: Mar. 7, 2019

(87) PCT Pub. No.: WO2018/052758
PCT Pub. Date: Mar. 22, 2018

(65) Prior Publication Data
US 2019/0191755 A1    Jun. 27, 2019

Related U.S. Application Data
(60) Provisional application No. 62/394,006, filed on Sep. 13, 2016.

(51) Int. Cl.
| | | |
|---|---|---|
| *A23L 33/00* | (2016.01) | |
| *A23L 33/115* | (2016.01) | |
| *A23L 33/19* | (2016.01) | |
| *A23L 33/185* | (2016.01) | |

(52) U.S. Cl.
CPC .............. *A23L 33/40* (2016.08); *A23L 33/00* (2016.08); *A23L 33/115* (2016.08); *A23L 33/185* (2016.08); *A23L 33/19* (2016.08); *A23L 33/30* (2016.08); *A23V 2002/00* (2013.01); *A23V 2200/332* (2013.01); *A23V 2200/3322* (2013.01)

(58) Field of Classification Search
CPC .......... A23L 33/00; A23L 33/19; A23L 33/30; A23L 33/40; A23L 33/115; A23L 33/185
USPC .......................................................... 426/2
See application file for complete search history.

(56) References Cited

U.S. PATENT DOCUMENTS

| | | |
|---|---|---|
| 5,308,832 A | 5/1994 | Garleb et al. |
| 8,940,689 B2 | 1/2015 | Di Pietro |
| 9,138,420 B2 | 9/2015 | D'Agostino et al. |
| 9,327,001 B2 | 5/2016 | Grant et al. |
| 2002/0160081 A1 | 10/2002 | Tiano et al. |
| 2004/0121044 A1 | 6/2004 | Tiano et al. |
| 2008/0089981 A1 | 4/2008 | Butler et al. |
| 2008/0233263 A1 | 9/2008 | Coy |
| 2011/0256299 A1 | 10/2011 | Helmke |
| 2013/0337144 A1 | 12/2013 | Lai et al. |
| 2014/0350105 A1 | 11/2014 | D'Agostino et al. |
| 2015/0025143 A1 | 1/2015 | Sathyavageeswaran et al. |
| 2016/0015069 A1 | 1/2016 | Klein |
| 2016/0067207 A1 | 3/2016 | D'Agostino et al. |

FOREIGN PATENT DOCUMENTS

WO   WO-2015184279 A1 *  12/2015  ............. A61K 31/20

OTHER PUBLICATIONS

Jabekk Pal T. et al., Resistance training in overweight women on a ketogenic diet conserved lean body mass while reducing body fat, Nutrition & Metabolism, vol. 7, No. 1, p. 17 (10 pp) (2010).
Ramaswamy, Lalitha et al., Proceedings of the Thirteenth International Society of Sports Nutrition (ISSN) Conference and Expo (Jun. 9-11, 2016), Journal of the International Society of Sports Nutrition, vol. 13 (Suppl 1), No. 33, pp. 1-27 (Sep. 1, 2016).
Rauch, Jacob T. et al., The effects of ketogenic dieting on skeletal muscle and fat mass, Journal of the International Society of Sports Nutrition, vol. 11 (Suppl 1), p. P40 (2014).
Park et al., HMB attenuatesmuscle loss during sustained energy deficit induced by calorie restriction and endurance exercise, Metabolism Clinical and Experimental, vol. 62, No. 12, pp. 1718-1729 (2013).

* cited by examiner

Primary Examiner — Jyoti Chawla
(74) Attorney, Agent, or Firm — Porter Wright Morris & Arthut LLP

(57) ABSTRACT

A nutritional composition comprises fat, protein and carbohydrate such that the fat provides from about 60 to about 90% of the total calories of the composition, the protein provides from about 10 to about 30% of the total calories of the composition, and the carbohydrate provides from about 0.1 to about 15% of the total calories of the composition, and the composition comprises from about 0.01 to about 10 wt % beta-hydroxy-beta-methylbutyrate (HMB). A method of achieving or sustaining metabolic ketosis in an individual comprises administering the nutritional composition to the individual. A method of maintaining lean body mass and muscle strength in an individual during dietary ketosis comprises administering the nutritional composition to the individual.

22 Claims, No Drawings

KETOGENIC NUTRITIONAL COMPOSITIONS

FIELD OF THE INVENTION

This invention is directed to ketogenic nutritional compositions, to methods of achieving or sustaining metabolic ketosis in an individual, and to methods of maintaining lean body mass and muscle strength in an individual during dietary ketosis.

BACKGROUND OF THE INVENTION

Ketosis is a metabolic state in which most of the body's energy supply comes from ketone bodies in the blood, in contrast to a state of glycolysis in which blood glucose provides most of the energy. In glycolysis, higher levels of insulin promote storage of body fat and block release of fat from adipose tissues, while in ketosis, fat reserves are readily released and consumed. For this reason, ketosis is sometimes referred to as the body's "fat burning" mode. Ketosis is generally characterized by serum concentrations of ketone bodies over 0.5 mM, with low and stable levels of insulin and blood glucose. Ketone bodies are formed by ketogenesis when liver glycogen stores are depleted or from metabolizing medium-chain triglycerides. The main ketone bodies used for energy are acetoacetate and β-hydroxybutyrate, and the levels of ketone bodies are regulated mainly by the fuels which are available, and insulin and glucagon levels change depending on that availability of fuels.

Long-term ketosis may result from fasting or ingesting a low-carbohydrate diet, and deliberately induced ketosis may be desired as a medical intervention for various conditions and/or for weight loss. However, a common problem for many subjects attempting to achieve and sustain dietary ketosis is avoiding the convenience of higher carbohydrate consumption. Metabolic ketosis requires strict limitations on carbohydrate consumption, e.g., less than 50 grams per day of carbohydrate, and it is often difficult to find convenient products for consumption which adhere to the desired balance of macronutrients, i.e., carbohydrate, protein and fat, necessary to reach and maintain ketosis. Many available products do not exhibit optimal ketogenic macronutrient ratios and therefore may contribute to total dietary protein intake that in fact inhibits ketosis.

In addition, another common problem with dietary ketosis for weight loss is unintended lean body mass loss, and many available products which are intended to assist in achieving and/or maintaining ketosis do not address the problem of unintended lean body mass loss during dietary ketosis for weight loss.

A need for nutritional products that exhibit an improved ketogenic macronutrient profile and also supports retention or improvement of lean body mass and/or muscle strength is therefore desired.

SUMMARY OF THE INVENTION

The invention is therefore directed to compositions suitable for obtaining and/or maintaining ketosis in an individual and to methods employing such compositions.

In one embodiment, the invention is directed to a nutritional composition comprising fat, protein and carbohydrate such that the fat provides from about 60 to about 90% of the total calories of the composition, the protein provides from about 10 to about 30% of the total calories of the composition, and the carbohydrate provides from about 0.1 to about 15% of the total calories of the composition, and the composition comprises from about 0.01 to about 10 wt % beta-hydroxy-beta-methylbutyrate (HMB).

In another embodiment, the invention is directed to a method of achieving or sustaining metabolic ketosis in an individual. The method comprises administering a nutritional composition according to the invention to the individual.

In another embodiment, the invention is directed to a method of maintaining lean body mass and muscle strength in an individual during dietary ketosis. The method comprises administering a nutritional composition according to the invention to the individual.

The compositions and methods of the invention are advantageous in providing the combination of a ketogenic macronutrient profile and the branched-chain amino acid metabolite HMB. This combination can sustain metabolic ketosis in an individual, and/or maintain or improve lean body mass and/or strength during sustained metabolic ketosis in an individual. Additional advantages of the invention will be more fully apparent in view of the following detailed description.

DETAILED DESCRIPTION

In one embodiment, the invention is directed to nutritional compositions. The term "nutritional composition" as used herein, unless otherwise specified, encompasses nutritional liquids, including emulsified liquids, and nutritional powders. The nutritional compositions are suitable for oral consumption by a human.

In other embodiments, the invention is directed to one or more methods. All combinations of method or process steps as used herein can be performed in any order, unless otherwise specified or clearly implied to the contrary by the context in which the referenced combination is made.

All percentages, parts and ratios as used herein, are by weight of the total composition, unless otherwise specified. All such weights as they pertain to listed ingredients are based on the active level and, therefore, do not include solvents or byproducts that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

Throughout this specification, when a range of values is defined with respect to a particular characteristic of the present invention, the present invention relates to and explicitly incorporates every specific subrange therein. Additionally, throughout this specification, when a group of substances is defined with respect to a particular characteristic of the present invention, the present invention relates to and explicitly incorporates every specific subgroup therein. Any specified range or group is to be understood as a shorthand way of referring to every member of a range or group individually as well as every possible subrange and subgroup encompassed therein.

The various embodiments of the nutritional compositions of the present disclosure may also be substantially free of any optional or selected ingredient or feature described herein, provided that the remaining nutritional composition still contains all of the required ingredients or features as described herein. In this context, and unless otherwise specified, the term "substantially free" means that the selected nutritional product contains less than a functional amount of the optional ingredient, typically less than 1%, including less than 0.5%, including less than 0.1%, and also including zero percent, by weight of such optional or selected essential ingredient.

The nutritional compositions and methods described herein may comprise, consist of, or consist essentially of the essential elements of the compositions and methods as described herein, as well as any additional or optional elements described herein or otherwise useful in nutritional product applications.

The nutritional compositions of the invention contain a macronutrient profile of fat, protein and carbohydrate suitable for maintaining a ketogenic diet, i.e., sustaining metabolic ketosis. In a specific embodiment, the nutritional compositions comprises fat, protein and carbohydrate such that the fat provides from about 60 to about 90% of the total calories of the composition, the protein provides from about 10 to about 30% of the total calories of the composition, and the carbohydrate provides from about 0.1 to about 15% of the total calories of the composition. In more specific embodiments of the nutritional compositions, the fat provides from about 70 to about 80%, from about 70 to about 85%, from about 60 to about 80%, or from about 70 to about 90%, of the total calories of the composition; the protein provides from about 15 to about 25%, from about 10 to about 25%, or from about 13 to about 30% of the total calories of the composition; and the carbohydrate provides from about 1 to about 15%, from about 0.1 to about 10%, from about 1 to about 10%, from about 0.5 to about 10%, from about 1 to about 7%, or from about 2 to about 7% of the total calories of the composition.

Thus, the nutritional compositions have a high fat, low carbohydrate content. In further embodiments, the nutritional compositions comprise from about 45 to about 80 wt % fat, from about 20 to about 45 wt % protein, and from about 0.1 to about 15 wt % carbohydrate, based on the combined weight of the fat, protein and carbohydrate. In more specific embodiments, the nutritional compositions comprise from about 45 to about 65 wt % fat, from about 45 to about 70 wt % fat, from about 50 to about 75 wt % fat, or from about 50 to about 70 wt % fat; from about 20 to about 40 wt % protein, from about 25 to about 40 wt % protein, from about 25 to about 35 wt % protein, or from about 20 to about 35 wt % protein; and from about 0.1 to about 10 wt % carbohydrate, from about 0.5 to about 10 wt % carbohydrate, from about 1 to about 10 wt % carbohydrate, from about 0.1 to about 8 wt % carbohydrate, from about 0.5 to about 8 wt % carbohydrate or from about 1 to about 8 wt % carbohydrate, based on the combined weight of the fat, protein and carbohydrate. In further specific embodiments, the weight ratio of fat to protein in the nutritional compositions is in the range of from about 1.1:1 to about 4.5:1, or, more specifically, from about 1.1:1 to about 4.0:1 or from about 1.5:1 to about 3.5:1.

The macronutrients suitable for use herein include any protein, fat (lipid), and carbohydrate or source thereof that is known for or otherwise suitable for use in an oral nutritional compositions, provided that the macronutrient is safe and effective for oral administration and is otherwise compatible with the other ingredients in the nutritional composition.

Fat

Any fat, most typically as emulsified fat, or a dried powder thereof, that is suitable for use in an oral nutritional product and is compatible with the essential elements and features of such products is suitable. Animal and/or plant derived oils are suitable, including genetically modified animal and/or plant derived oils. A specific embodiment of a genetically modified plant derived oil is a genetically modified plant seed oil. Reference to any of the animal- or plant-derived oils herein encompasses oil of a genetically modified version of the animal and/or plant source.

Non-limiting examples of suitable fats or sources thereof for use in the nutritional compositions described herein include whole egg powder, egg yolk powder, egg white powder, coconut milk, coconut oil, fractionated coconut oil, soy oil, corn oil, butter oil, olive oil, safflower oil, high oleic safflower oil, medium chain triglycerides (MCT oil), sunflower oil, high oleic sunflower oil, palm oil, palm kernel oil, palm olein, canola oil, algae oil, borage oil, marine oil, fish oil, cottonseed oil, any of said oils in powder form, or a combination of two or more thereof.

Additionally, fat may be provided as a structured lipid. Generally, a structured lipid comprises an oil or fat that contains specific fatty acyl residues in a specific position on the glycerol backbone. A structured lipid may contain mono-, di- and triglycerides, more typically di- and triglycerides, and, in specific embodiments, a higher percentage of triglycerides. The structured lipids typically contain medium chain fatty acids, i.e., acyl moieties having 4 to 12 carbon atoms, and/or long chain fatty acids, i.e., acyl moieties having more than 12 carbon atoms. Structured lipids are formed by (a) hydrolysis and esterification, (b) interesterification, (c) lipase-interesterification, (d) traditional chemical methods, or (e) genetic manipulation. They are particularly useful because of the way in which they are metabolized. Specific fatty acids can be attached to specific portions of the glycerol backbone to ensure that those fatty acids are absorbed at specific portions of the digestive process. Suitable structured lipids are disclosed, for example, by DeMichele et al, U.S. Pat. Nos. 5,661,180 and 5,962,712. In a specific embodiment, a structured lipid comprises an interesterified mixture of medium and long chain fatty acids of MCT oil and canola oil.

In another embodiment, the fat includes a long chain polyunsaturated fatty acid (LC-PUFA). LC-PUFAs, and particularly omega-3 and omega-6 PUFAs, may provide nutritional benefits to the user, such as helping to maintain the performance of the heart and cardiovascular system, reducing the levels of triglycerides (fats) in the blood, helping to regulate blood pressure and helping to maintain a regular heartbeat. In addition, omega-3 LC-PUFAs have been shown to be helpful in maintaining healthy bones and joints and a healthy brain. Exemplary LC-PUFAs for use in the nutritional products include arachidonic acid (ARA), docosahexaenoic acid (DHA), eicosapentaenoic acid (EPA), linoleic acid, linolenic acid (alpha linolenic acid) and gamma-linolenic acid derived from oil sources such as plant oils, marine plankton, fungal oils, and fish oils. In one particular embodiment, the LC-PUFAs are derived from fish oils such as menhaden, salmon, anchovy, cod, halibut, tuna, or herring oil. In a specific embodiment, LC-PUFAs may be included in an amount of from about 0.01 to about 30 wt %, by weight total fat in the composition. In more specific embodiment, LC-PUFAs may be included in an amount of from about 1 to about 20 wt %, from about 1 to about 15 wt %, or from about 5 to about 20 wt %, by weight total fat in the composition.

In specific embodiments of the nutritional compositions, the source of the fat comprises whole egg powder, butter powder, and/or coconut milk powder, or, more specifically, a combination of all three of these fat sources. In an alternate embodiment of the nutritional compositions, the source of the fat comprises a mixture of medium chain triglyceride (MCT) oils, alone or in combination with one or more additional fat sources. Suitable examples of the additional fat sources include, but are not limited to butter oil, high oleic safflower oil, high oleic sunflower oil, coconut oil, and/or a structured lipid, more specifically, a structured lipid comprising an interesterified mixture of medium and long chain fatty acids of MCT oil and canola oil. In a more specific embodiment, the source of the fat comprises greater than 50 wt %, or from about 55 to about 70 wt %, MCT oil and less than 50 wt %, or from about 30 to about 45 wt %, of one or more additional oils selected from the group consisting of butter oil, high oleic safflower oil, high oleic sunflower oil, and coconut oil, by weight total fat in the composition. In another more specific embodiment, the source of the fat comprises from about 25 to about 65 wt % MCT oil and from about 35 to about 75 wt % of coconut oil and a structured lipid, more specifically a structured lipid comprising an interesterified mixture of medium and long chain fatty acids of MCT oil and canola oil, by weight total fat in the composition. In yet another embodiment, the source of fat comprises MCT oil, coconut oil, and one or more of butter oil, high oleic safflower oil, high oleic sunflower oil, and a structured lipid, more specifically, a structured lipid comprising an interesterified mixture of medium and long chain fatty acids of MCT oil and canola oil.

Protein

Any protein or source thereof that is suitable for use in oral nutritional products and is compatible with the essential elements and features of such products is suitable.

Non-limiting examples of suitable protein or sources thereof for use in the nutritional products include hydrolyzed, partially hydrolyzed or non-hydrolyzed proteins or protein sources, which may be derived from any known or otherwise suitable source such as milk (e.g., casein, whey), animal (e.g., meat, fish), cereal (e.g., rice, corn), vegetable (e.g., soy, pea, canola) or combinations thereof. Non-limiting examples of such proteins include whole egg powder, egg yolk powder, egg white powder, whey protein, whey protein concentrate, whey protein isolate, whey protein hydrolysate, acid casein, casein protein isolates, sodium caseinate, calcium caseinate, potassium caseinate, casein hydrolysate, milk protein concentrate, milk protein isolate, milk protein hydrolysate, nonfat dry milk, whole cow's milk, partially or completely defatted milk, coconut milk, soy protein concentrate, soy protein isolate, soy protein hydrolysate, pea protein concentrate, pea protein isolate, pea protein hydrolysate, rice protein concentrate, rice protein isolate, rice protein hydrolysate, collagen protein, or a combination of two or more thereof.

Carbohydrate

Any carbohydrate that is suitable for use in an oral nutritional composition and is compatible with the essential elements and features of such products is suitable.

Non-limiting examples of suitable carbohydrates or sources thereof for use in the nutritional compositions described herein may include maltodextrin, including low dextrose equivalent maltodextrin, hydrolyzed or modified starch, hydrolyzed or modified cornstarch, glucose polymer, corn syrup, including high fructose corn syrup, corn syrup solids, rice-derived carbohydrate, sucrose, glucose, fructose, lactose, honey, sugar alcohol, e.g., maltitol, erythritol, sorbitol, or a combination of two or more thereof. In a specific embodiment, the only carbohydrate that is included in the nutritional composition is that inherent in the sources of fat and protein, i.e., no further carbohydrate ingredient is included in the composition.

HMB

The nutritional compositions also contain beta-hydroxy-beta-methylbutyrate (HMB). HMB is a naturally occurring short chain fatty acid metabolite of leucine that is known for use in a variety of nutritional products and supplements. Any source of HMB is suitable for use herein provided that the finished product contains HMB, including, but not limited to, the free acid, a salt, including an anhydrous salt, an ester, a lactone, or other product forms that otherwise provide a bioavailable form of HMB in the nutritional composition. Non-limiting examples of suitable salts of HMB for use herein include HMB salts, hydrated or anhydrous, of sodium, potassium, magnesium, chromium, calcium, or other non-toxic salt form. In a specific embodiment, the HMB is provided by calcium HMB monohydrate.

The nutritional compositions comprise from about 0.01 to about 10 wt % HMB. In a more specific embodiment, the nutritional compositions comprise from about from about 0.1% to about 7.0%, or more specifically, from about 0.1% to about 5.0%, HMB. In further embodiments, the nutritional compositions provide from about 1 to about 3 grams, or more specifically, from about 1.5 to about 3 grams, HMB per serving. For example, for a nutritional composition in a liquid form, a 325 ml serving of the composition, in a specific embodiment, provides from about 1 to about 3 grams HMB, or for a nutritional composition in a powder form, in a specific embodiment, a 65 g serving of the powder composition, adapted for mixing with 8 oz water, provides from about 1 to about 3 grams HMB.

Without being limited by theory, it is believed that in specific embodiments of the invention, HMB, in combination with the described ketogenic macronutrient profile, reduces muscle protein breakdown which often occurs in an individual on a ketogenic diet. Thus, in specific embodiments, administration of the nutritional compositions of the invention to an individual allows the individual to which the composition is administered to achieve and/or sustain ketosis while maintaining, i.e., avoiding significant loss of, lean body mass, i.e., muscle, and/or muscle strength. In additional specific embodiments of the invention, administration of the nutritional compositions of the invention to an individual allows the individual to which the composition is administered to continue ketosis while improving lean body mass, i.e., muscle, and/or muscle strength.

In additional embodiments of the nutritional compositions of the invention including one or more structured lipids as a source of fat, the combination of HMB and the structured lipid provide an advantageous combination of benefits. HMB reduces muscle protein breakdown, thereby helping to retain muscle mass, while the structured lipid provides medium chain fatty acids to muscle for fuel-preserving glycogen stores which increase exercise endurance. Such embodiments are therefore advantageous for an athlete consuming the nutritional compositions of the invention.

Product Form

The nutritional compositions encompasses nutritional liquids, including emulsified liquids, and nutritional powders. The nutritional powders include dry-mixed and/or spray dried powders and, in specific embodiments, are flowable or substantially flowable particulate compositions, or at least are particulate compositions that can easily be scooped and measured with a spoon or similar other device. The powder compositions can be reconstituted with water or other aqueous liquids to form a nutritional liquid prior to use.

In a specific embodiment, the liquid nutritional compositions and the reconstituted liquid compositions formed from the powder nutritional compositions have a thick consistency in the form of a conventional milkshake product. In other embodiments, the liquid nutritional compositions and the reconstituted liquid compositions formed from the powder nutritional compositions have a thinner consistency. The liquid nutritional compositions, including the reconstituted liquid compositions formed from the powder nutritional compositions, may thus have a variety of product densities, but most typically have a density greater than about 1.055 g/ml, including from 1.06 g/ml to 1.12 g/ml, and also including from about 1.085 g/ml to about 1.10 g/ml.

The liquid nutritional compositions, including the reconstituted liquid compositions formed from the powder nutritional compositions, may have a pH ranging from about 3.5 to about 8, more specifically in a range of from about 4.5 to about 7.5, including from about 5.5 to about 7.3, or from about 6.2 to about 7.2.

Optional Ingredients

The nutritional compositions may further comprise other optional ingredients that may modify the physical, nutritional, chemical, hedonic or processing characteristics of the products or serve as pharmaceutical or additional nutritional components. Many such optional ingredients are known or otherwise suitable for use in other nutritional compositions and may also be used in the nutritional compositions described herein, provided that such optional ingredients are safe and effective for oral administration and are compatible with the essential and other ingredients in the selected product form.

Non-limiting examples of such optional ingredients include amino acids and branched-chain amino acids, including, but not limited to, leucine, isoleucine and valine, and metabolites thereof such as alpha-hydroxyisocaproic acid (HICA), natural sweetners, calorie-free sweeteners, e.g., sucralose, acesulfame potassium, and/or stevia, preservatives, antioxidants, emulsifying agents, buffers, fructooligosaccharides, chromium picolinate, pharmaceutical actives, additional nutrients as described herein, colorants, flavoring and/or masking agents, sodium sources such as sodium chloride, thickening agents, including but not limited to hydrocolloids such as guar gum, xanthan gum, carrageenan, gellan gum, locust bean gum, gum acacia and combinations thereof, stabilizers, and combinations thereof.

The compositions may further comprise vitamins or related nutrients, non-limiting examples of which include vitamin A, vitamin D, vitamin E, vitamin K, thiamine, riboflavin, pyridoxine, vitamin B12, carotenoids, niacin, folic acid, pantothenic acid, biotin, vitamin C, choline, inositol, salts, and derivatives thereof, and combinations thereof. Further, the compositions may include one or more polyphenols, including, but not limited to, curcumin, demethoxycurcumin (DSMC), bis-demethoxycurcumin (BMC), and sources of polyphenols such as cocoa extract, green tea extract, blueberry extract, grape extract, and the like. Polyphenols are antioxidants and have vasodilatory effects which support blood flow and therefore are an advantageous addition for an athlete consuming the nutritional compositions of the invention.

The compositions may further comprise minerals, non-limiting examples of which include phosphorus, magnesium, calcium, iron, zinc, manganese, copper, sodium, potassium, molybdenum, chromium, selenium, chloride, and combinations thereof. In a specific embodiment, the compositions include sodium and potassium to counter dehydration effects encountered with ketogenic diets.

The compositions may also include one or more additional additives known in the art for nutritional compositions.

Methods of Manufacture

Generally, the nutritional compositions, whether in liquid or powder form, may be manufactured by any known or otherwise suitable method for making such compositions.

In a specific embodiment, the nutritional composition is manufactured in liquid form, and, more specifically, in an emulsion form, including, but not limited to a milk-based nutritional emulsion.

In one suitable manufacturing process, a nutritional liquid is prepared using at least three separate slurries, including a protein-in-fat (PIF) slurry, a carbohydrate-mineral (CHO-MN) slurry, and a protein-in-water (PIW) slurry. The PIF slurry is formed by heating and mixing the selected oils (e.g., canola oil, corn oil, etc.) and then adding an emulsifier (e.g., lecithin), fat soluble vitamins, and a portion of the total protein (e.g., milk protein concentrate, etc.) with continued heat and agitation. The CHO-MN slurry is formed by adding to water, with heated agitation, minerals (e.g., potassium citrate, dipotassium phosphate, sodium citrate, etc.), trace minerals (TM) and ultra trace minerals (UTM) premix, thickening or suspending agents (e.g. Avicel, gellan, carrageenan), and HMB. The resulting CHO-MIN slurry is held for 10 minutes with continued heat and agitation before adding additional minerals (e.g., potassium chloride, magnesium carbonate, potassium iodide, etc.) and/or carbohydrates (e.g., fructooligosaccharide, sucrose, corn syrup, etc.). The PIW slurry is then formed by mixing with heat and agitation the remaining protein (e.g., sodium caseinate, soy protein concentrate, etc.) into water.

The resulting slurries are then blended together with heated agitation and the pH adjusted to the desired range, typically from 6.6-7.0, after which the composition is subjected to high-temperature short-time (HTST) processing during which the composition is heat treated, emulsified and homogenized, and then allowed to cool. Water soluble vitamins and ascorbic acid are added, the pH is again adjusted to the desired range if necessary, flavors are added, and water is added to achieve the desired total solid level (typically 20-40 wt %). The composition is then aseptically packaged to form an aseptically packaged liquid emulsion nutritional composition, or the composition is added to retort stable containers and then subjected to retort sterilization to form a retort sterilized liquid emulsion nutritional composition.

The manufacturing processes for the nutritional emulsions may be carried out in ways other than those set forth herein without departing from the spirit and scope of the present disclosure. The present embodiments are, therefore, to be considered in all respects illustrative and not restrictive and that all changes and equivalents also come within the description of the present disclosure.

In a specific embodiment, a powder nutritional composition, may be formed as a spray dried nutritional powder composition, as a dry blended powder composition, or by a combination of such. the powder compositions may be prepared by any collection of known or otherwise effective techniques, suitable for making and formulating a nutritional composition in powder form.

The spray drying step may likewise include any spray drying technique that is known for or otherwise suitable for use in the production of nutritional powder compositions. Many different spray drying methods and techniques are known for use in the nutrition field, all of which are suitable for use in the manufacture of the spray dried nutritional powders herein.

One method of preparing the spray dried nutritional powder comprises forming and homogenizing an aqueous slurry or liquid comprising HMB, and optionally protein, carbohydrate, and fat, and then spray drying the slurry or liquid to produce a spray dried nutritional powder. The method may further comprise the step of spray drying, dry mixing, or otherwise adding additional nutritional ingredients, including any one or more of the ingredients described herein, to the spray dried nutritional powder.

The following Examples illustrate various aspects of the nutritional compositions of the invention.

Example 1

This example illustrates a 65 g serving of a powder nutritional composition of 400 calories, with 300 calories from fat, according to the invention. Table 1 provides a macronutrient/mineral composition description, while Table 2 provides an ingredient description:

TABLE 1

| Macronutrient/Minerals | Grams per 65 gram Serving |
|---|---|
| Protein | 20 |
| Carbohydrate | 5 |
| Fat* | 32 |
| Sodium | 0.300 |
| Calcium | 0.600 |

*Fat includes HMB.

TABLE 2

| Ingredients | Grams per 65 gram Serving | Wt % |
|---|---|---|
| Whole Egg Powder | 22.9719 | 35.3414% |
| Butter Powder | 22.9719 | 35.3414% |
| Whey Protein Isolate | 9.3907 | 14.4472% |
| Coconut Milk Powder/Fresh Fruit Ingredients | 3.0293 | 4.6604% |
| Ca-HMB | 3.0293 | 4.6604% |
| Flavorings | 2.3786 | 3.6593% |
| Gellan Gum | 0.3231 | 0.4971% |
| Calcium Silicate | 0.3029 | 0.4660% |
| Ascorbic Acid | 0.202 | 0.31% |
| Sweeteners (Stevia, Monk fruit) | 0.3878 | 0.5983% |
| Antioxidant (Mixed Tocopherols) | 0.013 | 0.02% |

The protein/carbohydrate/fat distribution of the relevant ingredients is shown in Table 3:

TABLE 3

| Ingredient, grams per 65 gram Serving | Protein, grams | Carbohydrate, grams | Fat, grams |
|---|---|---|---|
| Whole Egg Powder, 22.9719 | 9.19 | 1.1027 | 10.3374 |
| Butter Powder, 22.9719 | 2.1364 | 2.7566 | 17.2289 |
| Whey Protein Isolate, 9.3907 | 8.55 | 0.0470 | 0.1221 |
| Coconut Milk Powder/Fresh Fruit Ingredients, 3.0293 | 0.36 | 0.6059 | 1.9690 |
| HMB, 3.0293 | | | 2.5446 |

Example 2

This example illustrates a 325 ml serving of a liquid nutritional composition of about 390 calories, with about 300 calories from fat, according to the invention. Table 4 provides a macronutrient composition description, while Table 5 provides an ingredient description:

TABLE 4

| Macronutrient | Grams per 325 ml Serving |
|---|---|
| Protein | 21.4 |
| Carbohydrate | 0.2 |
| Fat* | 36.8 |

TABLE 5

| Ingredients | Grams per 325 ml Serving | Wt % |
|---|---|---|
| Water | QS | 78.4972% |
| Low Lactose Milk Protein Concentrate | 25.000 | 8.5323% |
| MCT Oil | 11.900 | 4.0614% |
| Coconut Oil | 5.712 | 1.9495% |
| Structured Lipid (Canola/MCT) | 15.300 | 5.2218% |
| Sunflower Lecithin | 1.088 | 0.3713% |
| Ca-HMB | 3.000 | 1.0239% |
| Carrageenan | 0.320 | 0.1092% |
| Sea Salt | 0.300 | 0.1024% |
| Sweeteners (Stevia, Monk fruit) | 0.384 | 0.1310% |

The examples and specific embodiments set forth herein are illustrative in nature only and are not to be taken as limiting the scope of the invention defined by the following claims. Additional specific embodiments and advantages of the present invention will be apparent from the present disclosure and are within the scope of the claimed invention.

What is claimed is:

1. An emulsified liquid nutritional composition, comprising fat, protein and carbohydrate, wherein the fat provides from about 60 to about 90% of the total calories of the composition, the protein provides from about 10 to about 30% of the total calories of the composition, and the carbohydrate provides from about 0.1 to about 15% of the total calories of the composition, wherein the composition comprises from about 45 to about 80 wt % fat, from about 20 to about 45 wt % protein, and from about 0.1 to about 15 wt % carbohydrate, based on the combined weight of the fat, protein and carbohydrate, wherein the weight ratio of fat to protein is in the range of about 1.1:1 to about 4.0:1, and wherein the composition comprises from about 0.1% to about 5.0% wt % beta-hydroxy-beta-methylbutyrate (HMB).

2. The nutritional composition of claim 1, wherein the fat provides from about 70 to about 80% of the total calories of the composition, the protein provides from about 15 to about 25% of the total calories of the composition, and the carbohydrate provides from about 1 to about 10% of the total calories of the composition.

3. The nutritional composition of claim 1, wherein the composition comprises from about 50 to about 70 wt % fat, from about 25 to about 40 wt % protein, and from about 0.1 to about 15 wt % carbohydrate, based on the combined weight of the fat, protein and carbohydrate.

4. The nutritional composition of claim 1, wherein a 325 ml serving of the composition provides from about 1 to about 3 grams HMB.

5. The nutritional composition of claim 1, wherein the HMB is provided as an ester of HMB, a lactone of HMB, a free acid of HMB or a salt of HMB.

6. The nutritional composition of claim 5, wherein HMB is provided as calcium HMB monohydrate.

7. The nutritional composition of claim 1, wherein a source of the fat comprises whole egg powder, egg yolk powder, egg white powder, coconut milk, coconut oil, fractionated coconut oil, soy oil, corn oil, butter oil, olive oil, safflower oil, high oleic safflower oil, medium chain triglycerides, sunflower oil, high oleic sunflower oil, palm oil, palm kernel oil, palm olein, canola oil, algae oil, borage oil, marine oil, fish oil, cottonseed oil, a structured lipid, any of said oils in powder form, or a combination of two or more thereof.

8. The nutritional composition of claim 7, wherein the source of the fat comprises whole egg powder, butter powder, and coconut milk powder.

9. The nutritional composition of claim 7, wherein the source of the fat comprises a structured lipid.

10. The nutritional composition of claim 7, wherein the source of the fat comprises MCT oil.

11. The nutritional composition of claim 10, wherein the source of the fat further comprises one or more additional oils selected from the group consisting of butter oil, high oleic safflower oil, high oleic sunflower oil, coconut oil and a structured lipid.

12. The nutritional composition of claim 1, wherein a source of the protein comprises whole egg powder, egg yolk powder, egg white powder, whey protein, whey protein concentrate, whey protein isolate, whey protein hydrolysate, acid casein, casein protein isolates, sodium caseinate, calcium caseinate, potassium caseinate, casein hydrolysate, milk protein concentrate, milk protein isolate, milk protein hydrolysate, nonfat dry milk, whole cow's milk, partially or completely defatted milk, coconut milk, soy protein concentrate, soy protein isolate, soy protein hydrolysate, pea protein concentrate, pea protein isolate, pea protein hydrolysate, rice protein concentrate, rice protein isolate, rice protein hydrolysate, collagen protein, or a combination of two or more thereof.

13. The nutritional composition of claim 1, wherein a source of the carbohydrate comprises maltodextrin, hydrolyzed or modified starch, hydrolyzed or modified cornstarch, glucose polymer, corn syrup, corn syrup solids, rice-derived carbohydrate, sucrose, glucose, fructose, lactose, honey, sugar alcohol, artificial sweetener, or a combination of two or more thereof.

14. The nutritional composition of claim 1, further comprising polyphenol.

15. The nutritional composition of claim 1, further comprising sodium and potassium.

16. A method of achieving or sustaining metabolic ketosis in an individual, comprising administering to the individual the nutritional composition of claim 1.

17. A method of maintaining lean body mass and muscle strength in an individual during dietary ketosis, comprising administering to the individual the nutritional composition of claim 1.

18. The nutritional composition of claim 1, wherein the composition comprises from about 45 to about 65 wt % fat, from about 25 to about 40 wt % protein, and from about 1 to about 10 wt % carbohydrate, based on the combined weight of the fat, protein and carbohydrate.

19. The nutritional composition of claim 1, wherein the weight ratio of fat to protein is in the range of about 1.5:1 to about 3.5:1.

20. The nutritional composition of claim 1, wherein a source of the protein comprises whey protein, whey protein concentrate, whey protein isolate, whey protein hydrolysate, acid casein, casein protein isolates, sodium caseinate, calcium caseinate, potassium caseinate, casein hydrolysate, milk protein concentrate, milk protein isolate, milk protein hydrolysate, nonfat dry milk, whole cow's milk, partially or completely defatted milk, coconut milk, or a combination of two or more thereof.

21. The nutritional composition of claim 1, wherein the only carbohydrate that is included in the nutritional composition is that inherent in the sources of fat and protein.

22. The nutritional composition of claim 1, wherein a source of fat comprises a structured lipid comprising an interesterified mixture of medium and long chain fatty acids of medium chain triglyceride oil and canola oil, a source of the protein comprises milk protein concentrate, milk protein isolate, milk protein hydrolysate, nonfat dry milk, whole cow's milk, partially or completely defatted milk, coconut milk, or a combination of two or more thereof, and the only carbohydrate that is included in the nutritional composition is that inherent in the sources of fat and protein.

\* \* \* \* \*